June 5, 1951            N. L. SCOTT            2,555,377
MACHINE FOR LINING PIPE WITH CEMENTITIOUS MATERIAL
Filed Jan. 7, 1948            2 Sheets-Sheet 1
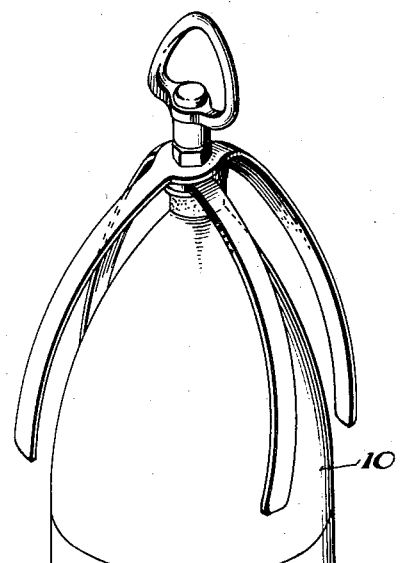
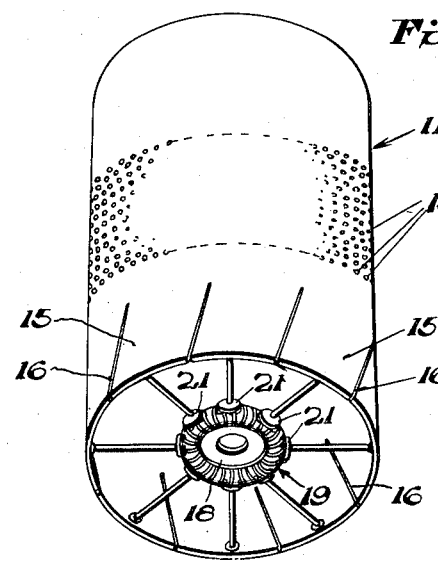
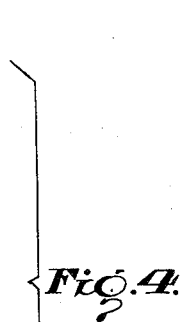
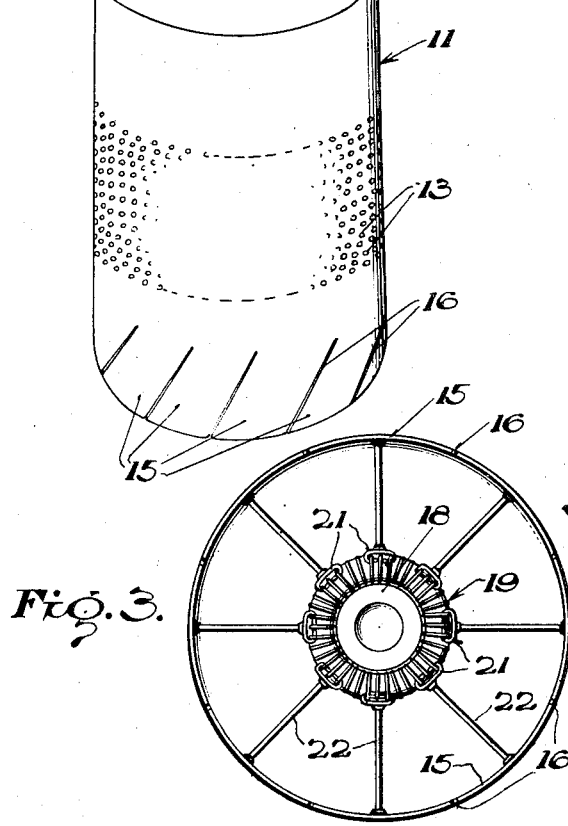
INVENTOR.
Norman L. Scott.
BY
Herbert M. Birch
Attorney June 5, 1951  N. L. SCOTT  2,555,377
MACHINE FOR LINING PIPE WITH CEMENTITIOUS MATERIAL
Filed Jan. 7, 1948  2 Sheets-Sheet 2
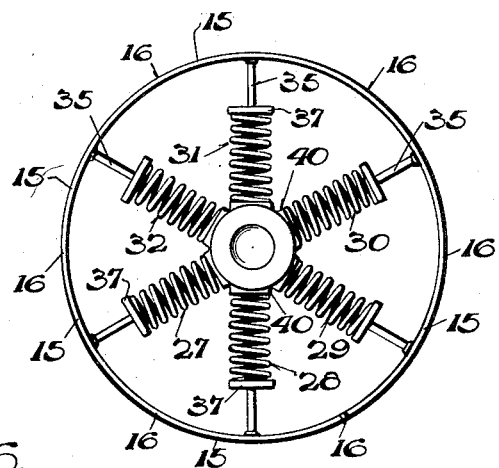
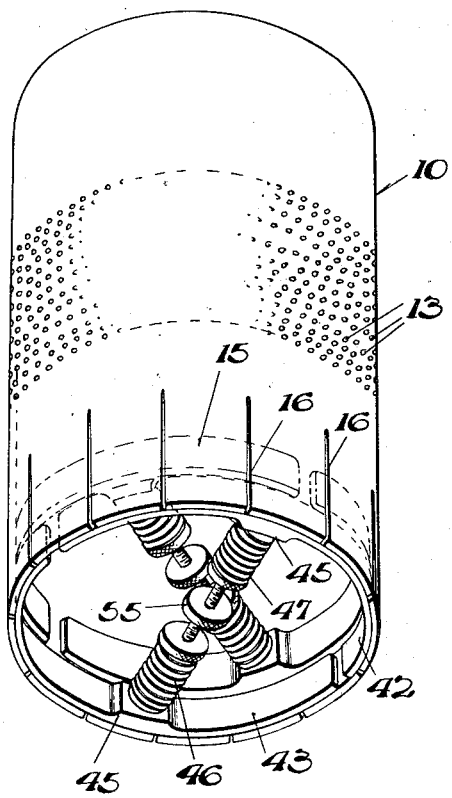
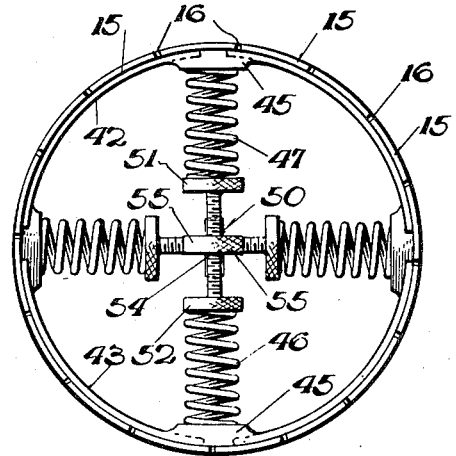
INVENTOR.
Norman L. Scott.
BY
Herbert M. Birch
Attorney Patented June 5, 1951

2,555,377

UNITED STATES PATENT OFFICE 2,555,377

MACHINE FOR LINING PIPE WITH CEMENTITIOUS MATERIAL

Norman L. Scott, Andover, Mass., assignor, by mesne assignments, to Pipe Linings, Inc., New York, N. Y., a corporation of Delaware Application January 7, 1948, Serial No. 906

8 Claims. (Cl. 25—38)

The present invention relates to machines for lining pipe with cementitious material and particularly to improvements in pipe lining machines which include a conical leading nose and a gradually rearwardly tapered hollow trailing spreader skirt or cylindrical trowelling device formed with dehydrating openings or slits.

Usually hollow spread skirts of such pipe lining machines have been made rigid. However, rigidity though desirable for the dehydrating section is undesirable at the skirt trailing section, which has the largest circumferential surface. For example, very often the pipes to be lined are defective and have interior bores formed with blisters or other obstructions and also the pipe bores may be oval shaped or of different diameters along the length of the pipe. When any of such conditions exist in the pipe bore, the rigid skirt machines sometimes become stuck in the pipe and it is then necessary to stop all operations until the machine is freed. For example in the case of pipe bores having a diameter of 12½ inches at one end and 11¾ inches at the other a rigid skirt will become stuck in the smaller diameter and if it is attempted to avoid this by using a smaller diameter lining machine, then when this smaller diameter machine reaches the larger diameter part of the pipe it will not properly dehydrate as the lining will be too thick. In this case without the proper dehydration the lining will fall down from the walls of the pipe. Then again it frequently happens that the pipe is not well laid and one section of the pipe has dropped down say about ¼ of an inch at the joint between pipe sections and the machine will sometimes get stuck at this joint. Accordingly to overcome this undesirable condition it is an object of the present invention to provide dehydrator cementitious material spreader skirts, which are adapted to be resiliently flexible under lateral load conditions, whereby the machines ride over irregular conditions such as hereinbefore mentioned in the bore of the pipe without sticking.

Another object of the invention is to provide a machine for lining pipe in the ground comprising a trailing cementitious material spreader skirt formed with a rigid dehydrating surface and a resilient flexible rear trowelling surface positioned at the greatest circumferential surface of the spreader skirt.

A further object of the invention is to provide in a lining machine for pipe in situ a hollow tapered spreader skirt formed with elongated slits from the trailing or trowelling end of the skirt to the progressively smaller circumferential surface of the dehydrating section thereof, including resilient means mounted within the trailing skirt back of the portions defined by the slits, whereby the said slit defined portions of the skirt are adapted to yield and resiliently deform under load caused by varying pressures developed from uneven conditions in the pipe being lined.

A further object is to provide a tapered hollow cementitious material spreader skirt for pipe lining machines having its larger trailing circumferential surface made resiliently flexible by a plurality of angularly disposed slits formed through the walls thereof, to thereby define yieldable sections backed with adjustable resilient means mounted within the skirt to vary the degree of resilient yieldability of the portions of the trailing spreader skirt defined by the slits at this point.

Still another object is to provide a pipe lining machine, which is more durable, economical and efficient in action than prior known lining machines of this type.

The above and other objects and advantages of the present invention will appear more fully hereinafter from a consideration of the detailed description which follows, taken together with the accompanying drawings wherein three embodiments of the invention are illustrated. It is to be expressly understood, however, that the drawings are for the purpose of illustration only and are not designed as a definition of the limits of the invention.

In the drawings wherein like reference characters refer to like parts throughout the several views:

Figure 1 is a perspective view of a complete machine illustrating the novel resilient yieldable spreader skirt of the present invention.

Figure 2 is a detail view of a spreader skirt illustrating one form of resilient yieldable mounting arrangement for the flexible sections defined by the slit portions of the skirt.

Figure 3 is a bottom plan view of the embodiment shown in Figure 2.

Figure 4 is a fragmentary detailed view of the means for attaching the flexible sections of the skirt to the resilient yieldable mounting arrangement illustrated by the embodiment in Figures 2 and 3.

Figure 5 is an end view of the trailing portion of a spreader skirt illustrating another form of the present invention.

Figure 6 is a perspective view looking from the trailing end of the skirt to illustrate still another embodiment of the present invention, and Figure 7 is a bottom plan view of the form illustrated in Figure 6.

Referring to the drawings in detail and first with particular reference to Figure 1 there is shown a pipe lining machine comprising a spring guided body with a nose 10 connected to a rearwardly tapering hollow spreader skirt or cylindrical trowelling portion 11. This spreader skirt portion 11 is formed with dehydrating openings 13 and a plurality of slits formed from the trailing end of the hollow skirt so as to define flexible sections extending rearwardly from the dehydrating portion thereof. These flexible sections for convenience sake are numbered 15 and may be defined by angular slits 16 as shown in the preferred form of Figures 1 and 2 or by straight slits such as shown in Figure 6.

In the embodiment illustrated in Figures 2, 3 and 4 there is provided a resilient means mounted within the trailing end of the skirt back of the flexible sections 15. This resilient means is provided for the purpose of resiliently and yieldably resisting lateral loads applied to the sections 15 during the lining operation, such as may be caused by pipes of varying diameters or pipes having various kinds of obstructions therein. This mounting comprises a center hub portion 18 with an annular grooved rim around which is an encircling coiled spring 19. The hub portion is sufficiently large with respect to the interior bore of the encircling coil of the spring 19 to cause the convolutions of the coil spring to be parted. Connected to some of the parted coils of the spring 19 are plates 21 provided with U-shaped feet 24 which engage with the coils of the spring to serve as anchors for support rods 22. These supporting rods are welded to the inner side of the flexible sections 15 at one end and at the other end are welded to the anchors or plates 21.

Another embodiment of the device is illustrated in Figure 5, which also includes a center hub 26. However, in this form there are provided a plurality of resilient yieldable members such as coiled springs 27, 28, 29, 30, 31 and 32. Any number of such springs may be used according to the number of flexible sections 15.

Secured to the center trailing edge surface of each flexible section 15, by welding or the like, is a spring support rod 35. This support rod 35 has formed on its free end a plate 37, which is welded to an end coil of one of the springs 27 to 32, while the other end coil is welded to a plate 40 carried by the hub 26. Thus each spring is mounted to yield resiliently as each section 15 is moved by exterior load pressures as the machine is moved forward through the bore of a pipe being lined.

A third embodiment of a resiliently yieldable backing arrangement for the flexible sections 15 of the skirt is shown in Figures 5 and 6. With this arrangement the skirt may be formed with a greater number of slits 16, which slits are made straight instead of angular.

To compensate for the extra number of slits 16 and extra flexibility of the skirt resulting from the extra slits, this resilient yieldable backing arrangement comprises diametrically opposed half-ring sections 42 and 43 each formed with a center block 45.

Each block 45 supports one end of a pair of aligned springs 46 and 47 preferably welded thereto, while the other ends of these springs are held at varying tensions by a clamp adjustment, comprising a threaded rod 50 with knurled discs 51 and 52 adjustable near each end, which seat against an end coil of each spring opposite the blocks 45. Intermediately mounted on the rod 50 is a turnbuckle arrangement, comprising an internally threaded sleeve 54 with an enlarged knurled part 55 adjustable to equalize the tension on the springs after they have been adjusted for tension by the discs 51 and 52.

If desired a duplicate of the foregoing described arrangement may be positioned and spaced up within the bore of the hollow skirt 10 to offer still greater resilient resistance to load pressure developed by obstructions, small diameters and oval shaped bores in the pipe line being lined.

Thus there is provided a hollow spreader device for pipe lining machines having its largest circumferential surface flexible, to thereby deform and compress under pressure loads caused by odd shaped and varied diameter pipe bores, poorly laid pipe lines and pipe bores with blisters and other obstructions to avoid sticking in the pipe during lining.

Although only three embodiments of the invention have been illustrated in Figures 1 to 7, inclusive, and described in detail, it is to be expressly understood that the same is not limited thereto. Various changes may be made in the design and arrangement of the parts illustrated, as will now be apparent to those skilled in the art. For a definition of the invention, reference will be had primarily to the appended claims.

I claim:

1. Apparatus for lining pipes with cementitious material comprising a hollow flared spreader with a conical leading nose and a yieldable resilient trailing end, said spreader having a maximum cross section at its trailing end of the same size and configuration as the required finished bore of a pipe when lined, a plurality of dehydrating openings intermediate the said nose and trailing end, a plurality of radially positioned and aligned flexible sections formed from said trailing end, and yieldable resilient means operatively connected to each of said sections within the said trailing end of the spreader adapted to yieldably resist inward displacements of the said flexible sections.

2. Apparatus for lining pipes in situ with cementitious material comprising a hollow flared spreader, said spreader having a maximum cross section at its trailing end of the same size and configuration as the required finished bore of a pipe when lined, a plurality of flexible sections formed from said trailing end of the spreader, and resilient means operatively connected to each of said sections within the trailing end of the skirt adapted to yieldably resist inward displacements of said sections from proper trowelling position and return said sections to proper trowelling position after the causes of such inward displacements are passed.

3. Apparatus for lining pipes with cementitious material comprising a hollow flared spreader, said spreader having a maximum cross section at its trailing end of the same size and configuration as the required finished bore of a pipe when lined, comprising a rigid nose, a flaring hollow skirt secured to the base of the nose, said skirt being rigid adjacent the nose base and formed with dehydrating openings, and said skirt being formed in flexible sections at its trailing end, and spring means operatively connected to each section, to thereby return the sections to their normal positions when temporarily deformed by encountering irregular conditions in the pipe bore being lined.

4. A machine for lining pipe in situ with cementitious material having a tapered body comprising a rigid conical nose, a hollow skirt formed with dehydrating openings, a trailing trowelling surface formed with slots extending from its trailing edge, and spring means operatively connected to the trowelling surface within the skirt under the trowelling surface to thereby provide a yieldable resilient surface at the maximum cross section of the body adapted to return said trowelling surface to proper trowelling position following any displacements of the said surface.

5. A machine for lining pipe with cementitious material having a tapered body comprising a rigid conical nose, a hollow skirt formed with dehydrating openings, a plurality of flexible sections in the trailing end of the skirt, and resiliently mounted rods in the trailing end of said skirt operatively connected to each of the said flexible sections to make them resiliently yieldable to excessive lateral pressure loads on the said sections to thereby return each section to proper trowelling position after passing the cause of said loads on the sections.

6. A machine for lining pipe with cementitious material having a tapered body comprising a hollow skirt having an intermediate surface formed with dehydrating openings, a trailing trowelling surface formed with angular slits extending from its trailing edge, to thereby define flexible sections, a resilient yieldable backing for said flexible sections comprising a hub, a coil spring looped around the hub, and connecting rods secured to the coils of said spring and to the inner surface of each flexible section for returning each section after displacement from trowelling position to proper trowelling position.

7. A machine for lining pipe with cementitious material having a tapered body comprising a rigid conical nose, a hollow skirt formed with a rigid surface formed with dehydrating openings, a trailing trowelling surface formed with slits extending from its trailing edge, to thereby provide a flexible surface at the maximum cross section of the body, a resilient yieldable backing for said flexible sections comprising a center mounting, spring means connected to said mounting, and connecting rods operatively connected to said spring means and each of said flexible sections for returning each section after displacement from trowelling position to proper trowelling position.

8. A machine for lining pipe in situ with cementitious material having a tapered body comprising a rigid conical nose, a hollow skirt formed with dehydrating openings, a trailing trowelling surface formed with slits extending from its trailing edge, to thereby provide a plurality of yieldable sections at the maximum cross sectional part of the body, a resilient yieldable backing for said yieldable sections comprising a center mounting, spring means connected to said mounting, connecting rods connected to said spring means and each of said flexible sections, said center mounting being adjustable, to thereby equalize and vary the tension of said spring means, whereby when obstructions in the pipe being lined push in the said sections, said resilient yieldable backing returns the sections to normal position, to thereby maintain a substantially uniform thickness of the lining in the pipe.

NORMAN L. SCOTT.

REFERENCES CITED

The following references are of record in the file of this patent:

UNITED STATES PATENTS

| Number | Name | Date |
| --- | --- | --- |
| 1,951,221 | Tate | Mar. 13, 1934 |
| 2,026,470 | Haskins et al. | Dec. 31, 1935 |
| 2,297,163 | Perkins | Sept. 29, 1942 |
| 2,399,321 | Butler | Apr. 30, 1946 |

FOREIGN PATENTS

| Number | Country | Date |
| --- | --- | --- |
| 103,804 | Australia | May 13, 1937 |
| 104,616 | Australia | July 19, 1938 |